(12) United States Patent
Wilcox

(10) Patent No.: US 7,066,276 B1
(45) Date of Patent: Jun. 27, 2006

(54) METHOD AND APPARATUS FOR EXCAVATING EARTH TO A DESIRED DEPTH

(76) Inventor: Alan R. Wilcox, 1057 Crown Point, Weidman, MI (US) 48893

( * ) Notice: Subject to any disclaimer, the term of this patent is extended or adjusted under 35 U.S.C. 154(b) by 0 days.

(21) Appl. No.: 10/685,040

(22) Filed: Oct. 14, 2003

(51) Int. Cl.
*G01C 3/00* (2006.01)
*A01B 79/00* (2006.01)

(52) U.S. Cl. .............................. 172/1; 172/4.5; 37/195; 37/907; 33/264; 33/296

(58) Field of Classification Search .................... 356/3, 356/3.01, 3.12; 172/1, 4.5; 701/23, 206, 701/207; 702/5; 37/195, 907, 348; 33/293–296, 33/264, 276, 285, 1 H, 521, 624, 625
See application file for complete search history.

(56) References Cited

U.S. PATENT DOCUMENTS

| | | | |
|---|---|---|---|
| 2,249,707 A | 7/1941 | Frost | |
| 3,588,249 A * | 6/1971 | Studebaker | ................ 356/4.08 |
| 3,606,957 A | 9/1971 | Fuzzell | |
| 3,618,686 A * | 11/1971 | Morsbach et al. | ........... 180/6.7 |
| 3,716,923 A | 2/1973 | Bazhaw | |
| 3,768,367 A | 10/1973 | Fuzzell | |
| 4,226,292 A | 10/1980 | Monte et al. | |
| 4,907,879 A * | 3/1990 | Webb | ..................... 356/139.05 |
| 4,973,970 A * | 11/1990 | Reeser | ................... 342/357.09 |
| 5,135,427 A * | 8/1992 | Suto et al. | .................. 446/433 |
| 5,452,639 A * | 9/1995 | Aulenbacher et al. | ....... 89/1.13 |
| 5,671,160 A | 9/1997 | Julian | |
| 5,852,493 A | 12/1998 | Monnin | |
| 5,871,386 A * | 2/1999 | Bart et al. | .................. 446/460 |
| 5,879,221 A | 3/1999 | Barton et al. | |
| 5,882,241 A * | 3/1999 | Mullaney et al. | ........... 446/462 |
| 5,907,111 A * | 5/1999 | Josten et al. | ................ 73/866.5 |
| 5,956,250 A * | 9/1999 | Gudat et al. | ................... 701/26 |
| 5,990,809 A | 11/1999 | Howard | |
| 5,994,688 A | 11/1999 | Jackson et al. | |
| 5,995,895 A * | 11/1999 | Watt et al. | ..................... 701/50 |
| 6,055,046 A | 4/2000 | Cain | |
| 6,088,623 A | 7/2000 | Yowler et al. | |
| 6,099,235 A | 8/2000 | Cain et al. | |
| 6,112,145 A | 8/2000 | Zachman | |
| 6,121,598 A | 9/2000 | Green et al. | |
| 6,292,258 B1 | 9/2001 | D'Alessandro et al. | |
| 6,325,590 B1 | 12/2001 | Cain et al. | |
| 6,590,640 B1 * | 7/2003 | Aiken et al. | ................ 356/3.01 |
| 6,597,992 B1 * | 7/2003 | Rooney et al. | ................. 702/5 |
| 2001/0048845 A1 | 12/2001 | Jack | |

* cited by examiner

*Primary Examiner*—Thomas B. Will
*Assistant Examiner*—Alexandra Pechhold
(74) *Attorney, Agent, or Firm*—Reising, Ethington, Barnes, Kisselle, P.C.

(57) ABSTRACT

A system and method of facilitating excavating a below grade opening at a construction site in a parcel of land includes a first vehicle having a motor operably connected to at least a pair of traction members and a second excavating vehicle. The motor is operably connected to a first receiver for receiving a signal from a remotely controlled transmitter to actuate the motor. Upon actuation of the motor, the motor rotates the traction members for maneuvering the first vehicle within the opening. The first vehicle has a graduated measurement device mounted generally vertically thereon for remotely controlled vertical telescopic movement. A second beam receiver is mounted to the graduated measurement device for receiving a laser beam from a laser transmitter to facilitate precise determination of the depth of the floor of the opening.

13 Claims, 3 Drawing Sheets

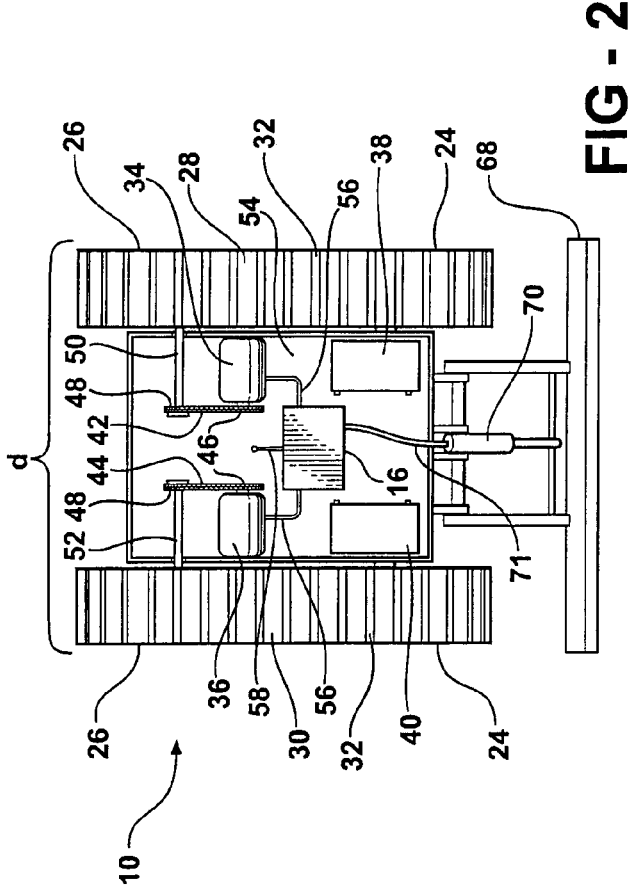
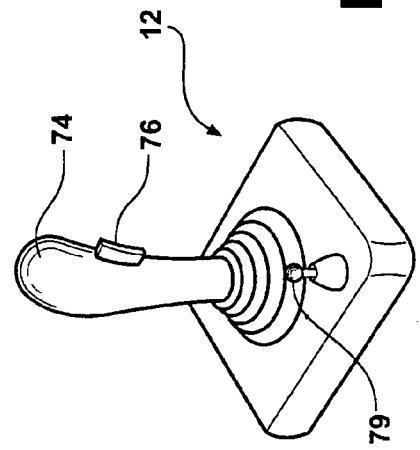
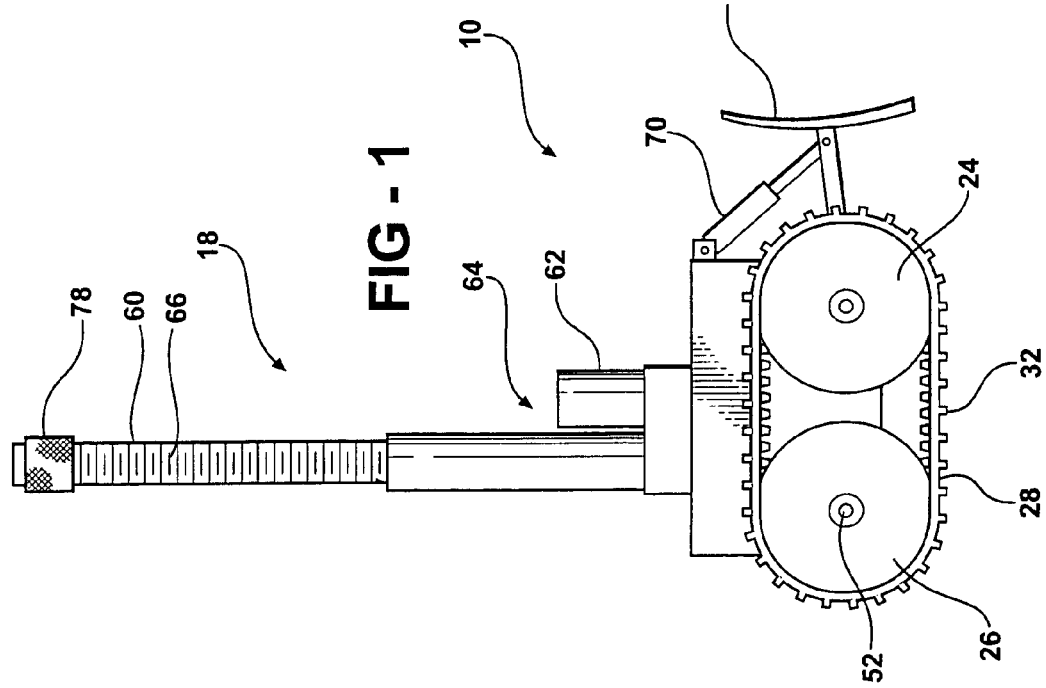

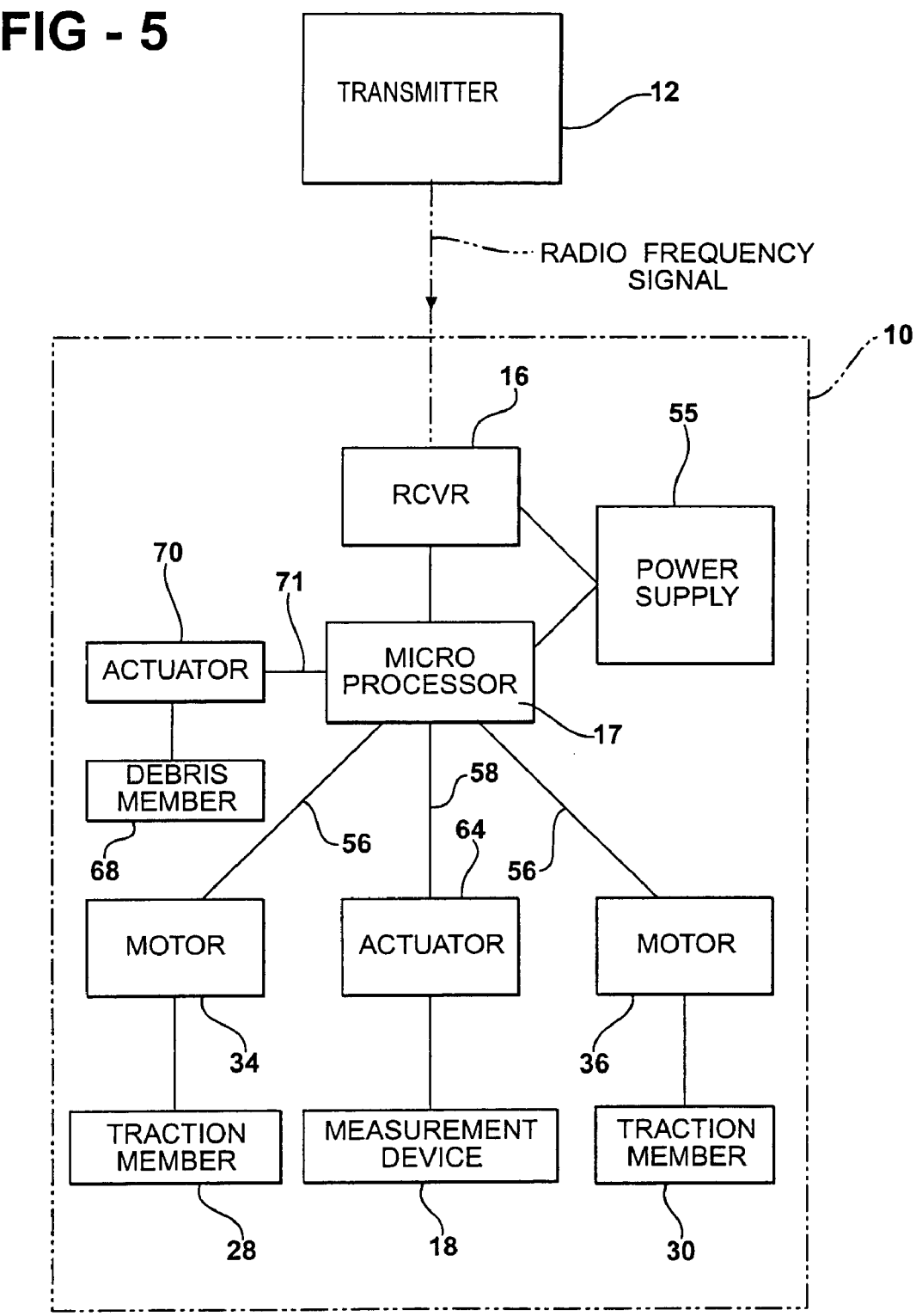

METHOD AND APPARATUS FOR EXCAVATING EARTH TO A DESIRED DEPTH

BACKGROUND OF THE INVENTION

1. Field of the Invention

The invention relates generally to a method and apparatus for excavating a basement or like below grade opening.

2. Related Art

At a construction site, a basement is typically constructed by excavating a portion of a parcel of land. Typically, the excavation must be continually monitored to determine how much more earth needs to be excavated. In a conventional process, an elevation survey is performed utilizing a transit and a target. Commonly, the transit is a laser transmitter used on the ground area surrounding the opening and the target is a laser receiver attached to a grade stick. The grade stick, and thus the laser receiver, is placed into the opening area and as the excavation proceeds, the elevation differential between the target and bottom of the excavation is determined. With this information, the necessary additional excavation can be performed to achieve the desired elevation for the floor of the opening.

The conventional crew typically includes a surveyor or transit man and a rod man. The rod man carries the grade stick to the points selected by the surveyor and holds the grade stick in a generally upright or vertical orientation so that the desired data related to elevation can be obtained as the hole is excavated. Excavation is performed and continues intermittently between excavations until the desired elevation is obtained. This measuring and excavating process is repeated until the excavation floor is at the desired elevation and level.

The conventional surveying techniques described above can be slow and tedious, since a rod man is needed to move the grade stick to various locations. In addition, the rod man can be subjected to difficulties, such as pests, weeds, brush, and ultimately dangerous situations that may result from depths at the excavation site presenting a risk of cave in. Additionally, the requirement for a rod man increases the possibility for miscommunication between the surveyor and the rod man and the need for two people to accomplish excavation adds inherent costs in the excavation process.

SUMMARY OF THE INVENTION

An apparatus for use in excavating adds a remotely controlled vehicle having a motor operably connected to at least a pair of traction members. The motor is operably connected to a first receiver for receiving a signal from a remotely controlled transmitter to actuate the motor. Upon actuation of the motor, the motor drives the traction members for maneuvering the vehicle along the floor of the excavation. The vehicle has a graduated measurement device mounted generally vertically thereon with a second receiver mounted to the graduated measurement device. The second receiver receives a laser beam from a laser transmitter to communicate the elevation of the depressed area.

Another aspect of the invention relates to the method of excavating and to the method of construction of the system. The method of excavating steps include providing a laser transmitter for emitting a laser beam signal at a predetermined elevation. Next, providing a first vehicle and arranging the first vehicle for remote control operation. Further, mounting a laser receiver to the first vehicle. Further, providing a second vehicle separate from said first vehicle and having an excavator for excavating the opening. Next, maneuvering the second vehicle to at least partially excavate the area in the parcel. Next, maneuvering the first vehicle by remote control within the area of the parcel being excavated to position the receiver on the first vehicle for receipt of the laser beam signal being sent from the laser transmitter. Next, obtaining an elevation measurement from the first vehicle and then, maneuvering the first vehicle by remote control within said area of the parcel being excavated, and lastly, maneuvering the second vehicle to further excavate the area if further excavation is needed to obtain the desired elevation.

One advantage of the invention provides a method for excavating a below grade opening that reduces the cost of excavation.

Another advantage of the invention provides a reduced possibility for miscommunication and error in obtaining elevation measurements while excavating the opening.

Another advantage of the invention provides a method and apparatus for excavating a parcel of land that eliminates the risk of harm to a rod man.

Another advantage of the invention provides an economical and efficient method and apparatus to excavate a parcel of land.

Another advantage of the invention provides an excavation system that is of relatively simple design and manufacture.

BRIEF DESCRIPTION OF THE DRAWINGS

These and other objects, features and advantages of this invention will become readily apparent from the following detailed description of the preferred embodiments, appended claims and accompanying drawings, in which:

FIG. 1 is a schematic side elevational view of a vehicle constructed according to one presently preferred embodiment of the invention;

FIG. 2 is a bottom plan view of the vehicle of FIG. 1;

FIG. 3 is a perspective elevational view of a transmitter for remotely controlling the vehicle of FIG. 1;

FIG. 5 is a schematic electrical control system which may be employed.

DETAILED DESCRIPTION OF THE PREFERRED EMBODIMENTS

Figure 4:
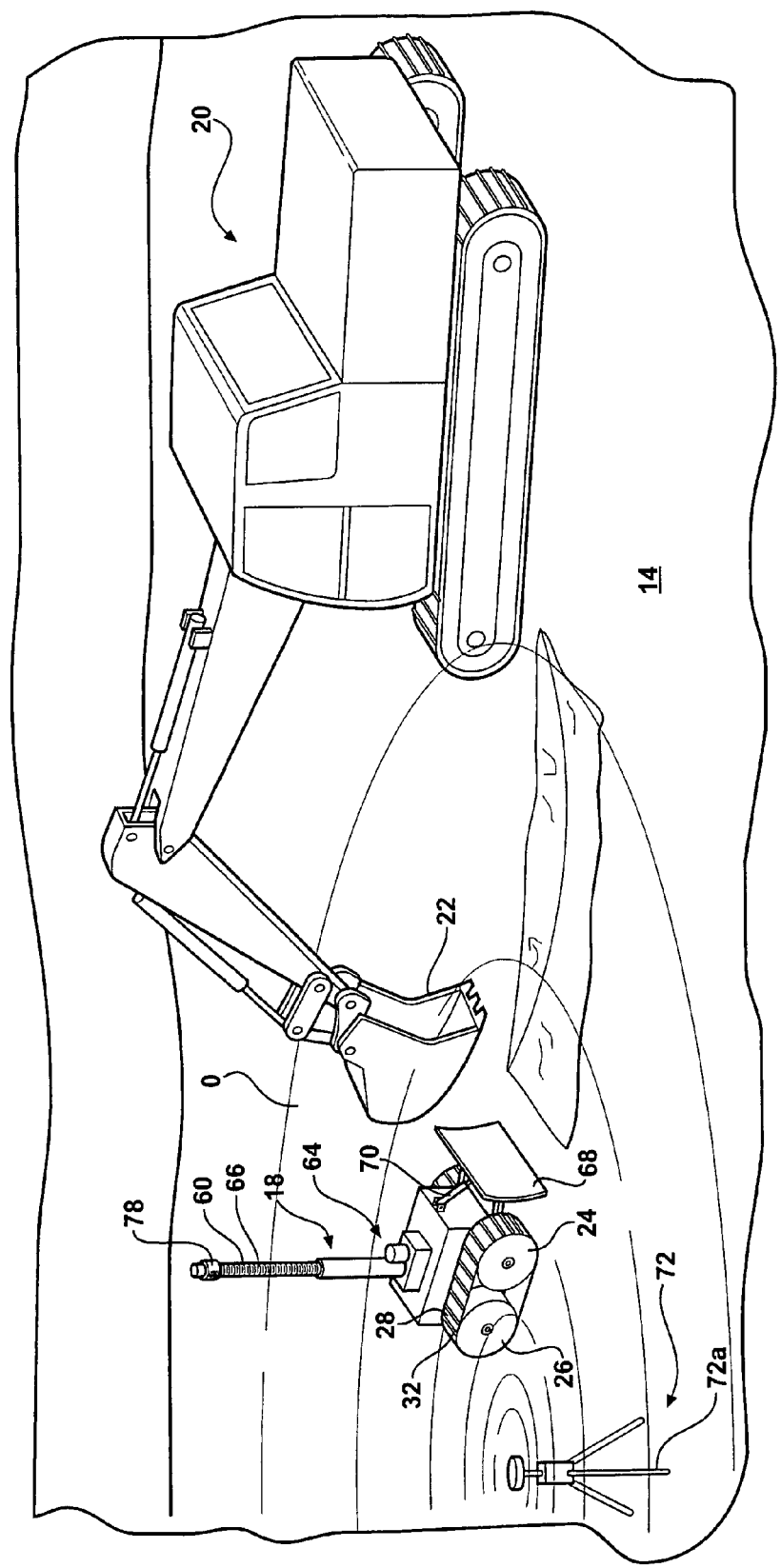
FIG. 4 is a schematic perspective view of a parcel of land being excavated with the use of the vehicle of FIG. 1.

Referring in more detail to the drawings, FIGS. 1 and 2 illustrate one presently preferred embodiment of a elevation measurement vehicle, referred to as a first vehicle 10 for facilitating excavating a basement or other opening O in a parcel of land 14 (FIG. 4). The first vehicle 10 is arranged for remote control operation so that a remote control transmitter 12 (FIG. 3) can send a signal to a first receiver 16 on the first vehicle 10 for maneuvering the first vehicle 10 within the opening O being excavated. The first receiver 16 is a radio frequency or other such commercial device having a microprocessor 17 either integrally formed therewith or separate therefrom and is typically obtainable from a laser equipment retailer. Once the first vehicle 10 is in the desired floor area of the opening O, an elevation measurement may be obtained from a vertically disposed graduated measurement device 18 on the first vehicle 10. Once the elevation measurement is obtained, the first vehicle 10 may be maneuvered via the remote control transmitter 12 from the immediate area of the opening O being excavated so that additional excavation may be performed by a excavation vehicle, referred to as a second vehicle 20, represented here as a backhoe 20 (FIG. 4) having an excavator, shown here as a bucket 22, from which the first vehicle 10 may be controlled. As a result of the first vehicle 10 being operable via the remote control transmitter 12, the first vehicle 10 eliminates the need to have two persons present to obtain the elevation measurement. Accordingly, the process of excavating the parcel of land 14 is made more efficient, more economical and safer, among other advantages, which are discussed in more detail hereafter.

The first vehicle 10 has a pair of front wheels 24 and a pair of rear wheels 26. Desirably, a pair of endless treads 28, 30 are received about the front wheels 24 and the rear wheels 26 for rotation therewith. The treads 28, 30 preferably have studs 32 extending outwardly therefrom to facilitate maintaining traction in use.

As shown in FIG. 2, generally a pair of actuators, represented here as electric motors 34, 36 are operably connected to the rear wheels 26, wherein the motors 34, 36 are operable to rotate the rear wheels 26 independently of one another. The electric motors 34, 36 are preferably connected to a battery system, represented here as a pair of batteries 38, 40. Desirably, the batteries 38, 40 are rechargeable as is known in the art. It should be recognized that any suitable mechanism may be used to couple the motors 34, 36 to the rear wheels 26, for example and without limitation, a pair of chains 42, 44 operably connecting a drive gear 46 extending from each motor 34, 36 to a driven gear 48 operably connected to a pair of drive shafts 52, 52. Accordingly, actuation of each motor 34, 36, either separately or together, causes respective fore or aft movement of the chains 42, 44. As such, the respective driveshafts 50, 52 are caused to rotate the respective rear wheels 26, thereby driving the respective treads 28, 30. It should be recognized that the chains 42, 44 may be replaced with belts, shaft linkages, or the like. It should also be recognized that the electric motors 34, 36 could be replaced with hydraulically driven motors, fuel combustion motors, or the like. In addition, the motors 34, 36, though shown operably connected to the rear wheels 26, could instead be operably connected to the front wheels 24, or to both the front and rear wheels 24, 26.

As shown in FIG. 2, the first receiver 16 is shown mounted to a bottom surface 54 of the vehicle 10. The first receiver is generally powered by a DC battery 55, though any suitable source of power can be used. It should be recognized that the first receiver 16 could be mounted in any desired location on the vehicle 10, and that it need not be mounted on the bottom surface 54 as shown here. The first receiver 16 is operably connected to the motors 34, 36, and is shown here to be connected by a pair of wires 56. Accordingly, the actuation of the motors 34, 36 can be controlled via the remote control transmitter 12 by sending a signal from the transmitter 12 to the first receiver 16, as represented schematically in FIG. 5, and disclosed generally in U.S. Pat. No. 5,135,427 to Suto et al., and U.S. Pat. No. 5,882,241 to Mullaney et al., incorporated herein in their entirety by reference.

As shown in FIG. 1, the first receiver 16 is also operably attached via a wire 58 (FIG. 2) to the graduated measurement device 18. The graduated measurement device 18 has a grade stick 60 in operable connection with the motor 62 of an actuator 64. Actuator 64 may incorporate a conventional ball nut and screw actuator device for example. Upon receiving a signal from the first receiver 16, as shown schematically in FIG. 5, the actuator 64 operates to move the plunger 62 between an extended position and a retracted position. As the actuator 64 moves the plunger 62 toward its extended position, the grade stick 60 moves conjointly with the plunger 62. An enumerated scale 66, preferably marked in inch or metric units, is marked along the length of the grade stick 60 so that an operator excavating the opening can readily read the number indicia of scale 66 to determine the relative vertical position of the lower surface of the treads with respect to a laser beam emitted from a laser transmitter 72 (FIG. 4), a constant in terms of elevation, the excavator can determine the depth of the floor of the opening from reading the scale and perform any further excavation necessary. The operator preferably maneuvers the first vehicle 10 and adjusts the axial position of the plunger 62, and thus grade stick 60 between the retracted and extended positions while remaining in the cab or seat of the second vehicle 20 via the remote controlled transmitter 12, discussed in more detail hereafter.

To facilitate obtaining an elevation reading from a level surface, preferably the first vehicle 10 has a debris member or blade 68 operable between a raised position and a lowered position via an actuator 70. The double acting fluid pressure actuator cylinder 70 is operably connected, generally by a wire 71, to the first receiver 16 so that the operator can remotely raise and lower the blade 68 by sending a signal from the remote control transmitter 12 to the first receiver 16. Upon maneuvering the first vehicle 10 to the area of the opening O being excavated, the operator can lower the blade 68 to engage the blade 68 with the floor surface of the opening O being excavated to remove any debris, such as rocks or the like, that may be present on the surface and which would interfere with level determination. Therefore, the first vehicle 10 can be positioned on a generally flat surface in the excavation so that the operator can obtain an accurate elevation reading from the graduate measurement device 18.

As shown in FIG. 4, in operation and with an opening O partially excavated, an operator sets up the laser transmitter 72 on transit base 72*a* for emitting a laser beam signal at a predetermined elevation above the floor of the opening O to a second receiver, represented here as a laser target 78. The laser system illustrated may be one commercially purchased from Spectron Precision, Inc. of Dayton, Ohio such as the 1242. Typically, U.S. patents disclosing suitable laser systems which are incorporated herein by reference include U.S. Pat. Nos. 6,055,046 and 6,292,258. With the laser transmitter 72 emitting a laser beam signal, the operator can maneuver the vehicle 10 into the opening O by maneuvering a joy stick 74 on the remote control transmitter 12, as shown in FIG. 3. Then the operator can lower the blade 68 by actuation of a switch 76 on the remote control transmitter 12 and remove any debris, such as rocks, that may be present in the area where the elevation measurement is to be taken. With the first vehicle 10 in position, the operator can depress another switch or button 79 to extend or retract the graduated measurement device 18 so that target 78 receives the laser beam signal being sent from the laser transmitter 72 and thereby obtain an elevation measurement of the floor of the opening O. Upon the second laser receiver 78 being positioned to receive the laser beam signal, the operator can read the measurement on the grade stick 60 to determine what additional excavation is required. Once the operator obtains the elevation measurement, the first vehicle 10 can be maneuvered away from the area to be further excavated, again through the use of the remote control transmitter 12 by manipulating the joy stick 74 to send a signal to the first receiver 16 and thus, to maneuver the rear wheels 26 and the treads 28, 30, as desired.

The operator of the backhoe 20 can continue the excavation process and the measurement process through utilization of the first vehicle 10 until the desired elevation of the area being excavated is obtained. With the operator being able to maneuver the first vehicle 10 via the remote control transmitter 12, the previous requirement for a second operator to hold the grade stick 60 is no longer necessary. Accordingly, associated costs, time expenditures, risks and the like are eliminated.

Preferably, the first vehicle 10 is of a size such that the vehicle 10 can be maneuvered in tight areas. As shown in FIG. 4, a common size bucket 22 on a backhoe has a width of about two feet (2'), and thus, the treads 28, 30 on the first vehicle 10 are arranged so that their outer edges are laterally spaced a distance (d) to fit within a two foot (2') wide trench. Generally, the distance (d) is just less than two feet (2').

It should be recognized that the above description represents a currently preferred embodiment, and that modifications can be made to the construction without departing from the scope of the invention. The above is meant to be exemplary and not limiting. The invention is defined by the claims that follow.

I claim:

1. A method of excavating a below grade opening having a lower floor surface at a construction site, comprising the steps of:
   providing a laser transmitter for emitting a laser beam signal at a predetermined elevation;
   providing a first vehicle;
   providing a remotely controlled receiver for receiving the laser beam signal emitted from said laser transmitter;
   connecting said first vehicle for remote control operation;
   mounting said receiver to said first vehicle for vertical movement thereon to provide a depth of opening measurement;
   providing a second vehicle separate from said first vehicle and having an excavator for excavating said opening;
   maneuvering said second vehicle to at least partially excavate said opening;
   maneuvering said first vehicle by remote control within said opening being excavated to position the receiver for receipt of the laser beam signal being sent by the laser transmitter;
   remotely vertically moving said receiver and remotely obtaining an elevation measurement from the first vehicle for an area of the floor surface occupied by said first vehicle;
   maneuvering said first vehicle by remote control to a new location on said floor surface, and
   maneuvering said second vehicle to further excavate said area to obtain the desired depth over said floor surface.

2. The method of claim 1 further comprising providing a graduated measurement device operable between a vertically retracted position and a vertically extended position and mounting said device to said first vehicle for operable communication with said receiver.

3. The method of claim 2 including arranging the graduated measurement device for remote control operation between said retracted and extended positions.

4. The method of claim 1 further comprising providing a debris member on said first vehicle for moving debris from said area of the floor surface to facilitate obtaining an accurate elevation measurement.

5. The method of claim 4 including arranging said debris member for movement between a raised position and a lowered position.

6. The method of claim 5 including arranging said debris member for remote control operation between said raised and lowered positions.

7. A method of constructing an excavating system for use in excavating an opening having a below surface grade opening floor in the earth's surface of predetermined depth comprising:
   providing an excavation vehicle;
   providing an elevation measurement vehicle supported on independently driven traction members for maneuvering upon said floor and having a vertically telescopic measurement device movable between retracted and extended positions with a laser beam target at its upper end;
   providing a laser transit to be located adjacent said opening and having a laser beam transmitter thereon; and
   providing remote control communications between said excavation vehicle and said elevation measurement vehicle for remotely controlling maneuvering movement of said independently driven traction members and vertical movement of said measurement device between its retracted and extended positions from said excavation vehicle.

8. The method of claim 7 further comprising providing said traction members as a pair of laterally spaced treads.

9. A method of constructing an excavating system for use in excavating an opening having a below surface grade opening floor in the earth's surface of predetermined depth comprising:
   providing an excavation vehicle;
   providing an elevation measurement vehicle supported on driven traction members for maneuvering upon said floor and having a vertically telescopic measurement device with a laser beam target at its upper end;
   providing a laser transit to be located adjacent said opening and having a laser beam transmitter thereon;
   providing remote control communications between said excavation vehicle and said elevation measurement vehicle for remotely controlling maneuvering movement of said elevation measurement vehicle and vertical movement of said measurement device from said excavation vehicle; and
   providing a debris member on said elevation measurement vehicle for movement between a lowered position for moving debris from said earth's surface to facilitate obtaining an accurate elevation measurement and a raised position.

10. An excavating system for excavating a below grade floor surface in the earth comprising in combination:
   an excavation vehicle;
   an elevation measurement vehicle supported on motor driven traction members for maneuvering movement to various locations on said floor surface;
   a vertically moveable motor driven vertical measurement device having a beam target on said elevation measurement vehicle;
   a beam emitter to be positioned above said floor for transmitting a beam to said beam target at a precise elevation; and
   remote control connections between said excavation vehicle and said traction members and said measurement device for remotely controlling their movement from said excavator vehicle.

11. The excavation system of claim 10 wherein said traction members are moveable relative to one another.

12. The excavation system of claim 10 further comprising a debris member on said elevation measurement vehicle for movement between a lowered position for moving debris from said floor's surface to facilitate obtaining an accurate elevation measurement and a raised position.

13. The excavation system of claim 12 wherein said debris member is moveable between its raised and lowered positions through remote control connections between said excavation vehicle and said elevation measurement vehicle.

* * * * *